Patented Jan. 18, 1938

2,105,825

UNITED STATES PATENT OFFICE 2,105,825

PLASTIC

Claude H. Smith, Tallmadge, Ohio, assignor to Wingfoot Corporation, Wilmington, Del., a corporation of Delaware No Drawing. Application May 10, 1934, Serial No. 724,948

2 Claims. (Cl. 91—68)

This invention relates to a new plastic. It includes the new plastic composition, the method of preparing it, and tanks lined therewith. More particularly the invention relates to a composition which comprises asphalt and residue from the distillation of rubber, which composition within a relatively wide temperature range does not become brittle nor so soft that it will flow.

Heretofore asphalt has been proposed as a lining for tanks, such as tanks employed for the storage of or treatment with various corrosive materials, but it has been found that although asphalt of a certain hardness may be used within a very limited range of temperatures with some degree of satisfaction it is not satisfactory for use where a wider range of temperatures is employed. If the tank becomes cooled below a certain temperature the lining will become hard and brittle and may be sheared from the tank because of differences in the thermal expansion of the tank and the lining. Or the lining may be injured at such lower temperatures when struck. On the other hand at a somewhat higher temperature the asphalt will become so soft that it will flow from the wall of the tank. Similar objections apply to asphalt used in other ways.

It has now been found that by compounding with the asphalt a residue from the distillation of rubber with or without other ingredients a plastic is obtained which is suitable for lining tanks and which does not become brittle or flow over a temperature range of 100° F. or even over a temperature range of 150 or 175° F. or more. A plastic for use at high temperatures is compounded somewhat differently from one designed for use at low temperatures. But regardless of whether the composition is compounded for use at high temperatures or at low temperatures any particular composition is satisfactory over a temperature range of 100° F. or even 175° F. or more. For example, in pickling tanks where steel is treated with pickling material such as dilute sulfuric acid at a temperature in the neighborhood of 200° F. a composition is used which does not become brittle when the temperature drops to 125 or 150° F. and does not become so soft that it flows as the temperature is increased to 250 or 275° F. However, if the tank is ordinarily to be used at a temperature in the neighborhood of 50° F. a somewhat different composition will ordinarily be employed for lining the tank, but this composition will be so compounded that it does not become brittle at temperatures as low as 0° F. or somewhat lower and will not flow if heated to 100 or 150° F. Thus each different compound has a working range of 100 or even 150 or 175° F. or more and by proper compounding a lining may be prepared which is suitable for use at a temperature around 0° F. or somewhat below or a composition may be prepared for use at a temperature as high as 250 or 350° F. or somewhat higher.

The asphalt used in the new plastic may be a natural asphalt or a blown asphalt prepared by blowing the residue from the distillation of petroleum with air. For asphalts having different properties somewhat different compounding formulae will be employed and these formulae will be varied depending upon the temperature range within which the plastic is to be used. For a hard asphalt, for example, somewhat more of the rubber distillation residue or a somewhat softer rubber distillation residue than for a softer asphalt is used. In general a blown asphalt having a flow point in the neighborhood of 350 or 400° will be used in compounding tank linings for use in the temperature ranges usually employed in the storage or treatment of chemical solutions at atmospheric pressures. However, asphalts of lower flow point, such as 325° F. or lower, and even asphalts blown to a flow point of 250° F. may be employed in a lining to be used at temperatures around 0° F. or lower. The rubber distillation residue may be compounded with a mixture of asphalts, e. g. a mixture of Gilsonite and a blown asphalt with a flow point of around 250° F. up to 350 or 400° F.

The rubber distillation residue used in preparing the new plastic may vary somewhat in properties although in general a residue with a Shore hardness of about 80 at 30° C. will be employed. The end point of the distillation may be varied somewhat so that a residue with a hardness of about 70 or 75 or a hardness of about 85 or 90 or even 95 may be used. The distillation is so regulated that when the rubber residue is mixed with the asphalt the final product will have a working range of at least 100° F. in which it does not become brittle or does not become so soft as to flow.

The rubber distillation residue may be prepared from crude rubber or vulcanized rubber. In either event the rubber is first cleaned and dried and preferably cut into small pieces. If vulcanized rubber such as old rubber tires is employed the fibrous material is all or substantially all separated from the rubber before the rubber is subjected to distillation. Old tires, old tubes, and other forms of scrap rubber may be employed. When such vulcanized rubber is used as the starting material the rubber residue will contain mineral ingredients not present in crude rubber, but such inert matter does not have a detrimental effect upon the plastic and in many instances additional inert material is added to the plastic before use. The starting material in a subdivided state is advantageously added to a fire-heated pot or kettle, advantageously one equipped with stirring means and a condenser. The distillation is usually carried out at atmospheric pressure and the distillate recovered as a by-product. The rubber is preferably added gradually so that all of the solid rubber in the still is surrounded by molten material to give efficient heat transfer between the walls of the still and the solid rubber so as to minimize decomposition. The rubber melts at a temperature in the neighborhood of 180–190° C. The temperature is raised to around 200° C. and maintained at this temperature while all or a large part of the isoprene is vaporized. The temperature is then raised and dipentene distilled off. The distillation will ordinarily be carried to a temperature around 250 to 300° C. L. E. Weber in the "Chemistry of Rubber Manufacture" gives as a typical analysis of the products obtained by the dry distillation of washed and dried, fine, hard Pará rubber: isoprene ($C_5H_8$) 6.2%, dipentene ($C_{10}H_{10}$) 46.0%, heveene ($C_{15}H_{24}$) 17%, poly terpenes 26.8%, carbon residue 1.9%, mineral residue 0.5%, loss 1.4%. Considering rubber to be of this composition the distillation will be such as to remove the isoprene and most or all of the dipentene without distilling any more than a small amount of heveene. Starting with crude rubber about 40% of the weight of the rubber will be removed in the still so that the residue does not comprise over 60% by weight of the starting material. Pine tar oil and softeners present in vulcanized rubber will be volatilized during the distillation. The end point is advantageously determined by sampling and testing and continuing the distillation until a residue with a Shore hardness of about 80 is obtained. The residue is then advantageously withdrawn from the still into a suitable receptacle or receptacles and cooled.

To compound the plastic composition the residue and asphalt are advantageously added to a fire-heated pot and melted. Any oil used as a softener or plasticizer is added with stirring. Inert material, such as asbestine, etc. is then added and stirred in until a uniform mixture is obtained.

The plastic may be prepared in two forms, in one of which it is applied in a molten state and in the other of which it may be applied by trowelling. In the latter case sufficient volatile solvent is added to give the desired plasticity and on evaporation of the solvent a product is obtained which is similar to that produced by using the plastic in a molten state. In compounding compositions for either method of application the same ratio of asphalt and rubber residue may be used. For a composition which is to be subjected to changes in temperature within the range of 120° to 300° F., or preferably within the narrower range of 150 to 250° F., a mixture of 25 parts of rubber residue with a Shore hardness of 80 and 75 parts of blown asphalt with a flow point of about 350° F. proved satisfactory. For a trowelling mixture, 5 parts of short fiber asbestos and 65 of asbestos powder is advantageously added to give body to the lining. Such asbestos improves the trowelling properties of the plastic if it is to be applied in this manner. If the material is to be applied in the molten state it has been found advantageous to add 70 parts of asbestos powder instead of the mixture of asbestos powder and fiber, and no solvent is required. Other fillers, fibrous or otherwise, may be added, such as silica sand, mica, barium, sulphate, etc.

For a tank lining which is to be subjected to changes in temperature from about zero to about 170° F. above zero, somewhat more rubber residue is added and a plasticizer or softener is also advantageously employed. For this purpose 70 parts of asphalt with a flow point of about 350° F. to 30 parts of rubber residue of 80 Shore hardness with about 5 parts of mineral oil such as light machine oil and preferably also 70 parts of asbestos powder will be found satisfactory for a material to be applied in the molten state. Short fiber asbestos is advantageously substituted for 5 parts of asbestos powder in the above formula for trowelling compound.

Between the composition above described for use at high temperatures and that described for use at low temperatures compositions for use at intermediate temperatures may be prepared as follows, although asphalts somewhat harder or softer than the blown asphalt with a flow test of 350° F. used in these formulae and rubber residue with a somewhat different hardness from the Shore hardness of 80 employed in these formulae may be utilized. For compositions to be used within the temperature range of 40 or 50° F. to 212° F., 70 parts of such asphalt and 30 parts of such rubber distillation residue together with 2½ parts of mineral oil and asbestos powder and fiber will be found satisfactory for materials to be applied in the molten state and by trowelling. For a composition to be used within a temperature range of 75° F. to 250° F., 70 parts of the asphalt and 30 parts of the rubber residue with asbestos powder and fibre will be found satisfactory.

In lining a tank either with a trowelling mixture or a molten material, if the tank is of steel it is first sand-blasted to clean it and it is then heated to a temperature in the neighborhood of 220° F. by a blow torch or other suitable means and the lining is applied to the heated surface. If the lining is to be applied to a wooden tank it may be applied directly to the wood if the wood is first heated with a blow torch to a temperature which is uncomfortable to the touch. If the tank is an old wooden tank in which the wood has deteriorated somewhat or is wet it is advantageous to first line it with soft pine or any suitable non-resinous wood before applying the coating. A brick tank may be lined by trowelling a suitable composition to the wall, previously heated, or the lining composition may be formed into slabs by pouring the molten material into forms. After the slabs have cooled and hardened, they are removed from the forms. One surface is heated, preferably with a blow torch, and this is pressed against the heated wall. It is advantageous to bring only small sections of the wall to the desired temperature, and heat only a portion of the slab, and then after these have been pressed together, to heat further areas of each and thus apply the slab. When the lining is applied by trowelling it is advantageously built up by applying various layers, each of which is perhaps ⅛" thick. Two or more such layers will give a satisfactory coating.

If the plastic is applied as a slab and the tank is of steel, the tank after sand-blasting is heated to the temperature of boiling water or higher and the surface of the slab which is to come next to the tank is heated with a blow torch until it becomes sticky and then the two are placed together and pressure is applied to form a firm union between the two. The plastic may be formed into slabs or sheets and these may be rolled and the lining then applied by unrolling the plastic against the heated tank wall or bottom, and applying a blow torch to the plastic material as it is unrolled to make it sticky and firmly adhesive. Any type of tank is advantageously painted with asphalt and rubber distillation residue before applying a lining of this type, either by trowelling or in the molten state. A steel tank is sand-blasted and thoroughly cleaned before painting. A wooden tank may be painted with such a composition heavily loaded with asbestos powder. A wooden tank so painted may be heated to a high temperature with a blow torch before applying the lining. The wooden tank is preferably heated before being painted, although this is not necessary if the wood is thoroughly dry. The paint adheres firmly to the metal or wood and forms a firm bond with the lining. The paint may contain asphalt and rubber distillation residue (and plasticizer, if any) of the kind and in the proportion employed in the lining, although this is not necessary.

In a tank, the lining of which is to be subjected to rough treatment a wall of bricks may be built up inside of the lining of plastic material to prevent this lining from becoming damaged. For example, where a tank is to be used for pickling sheet steel a steel or other tank may be lined with the plastic material, either by trowelling or by applying it in the molten state, and this lining may then be protected by building up a brick wall against the lining on the wall of the tank, and the floor of the tank may be covered with bricks. These bricks should be of the acid-proof type if the tank is to be used for acids. The new plastic material may be employed for plastering the bricks together and one advantageous method of forming a floor is to space the bricks a slight distance apart and then fill in between them with molten plastic of the type here described.

These plastic linings are resistant to weak mineral acids (hot or cold) and to weak organic acids, to salts of inorganic acids, to alkalies (weak or strong) and to weak alcohols and aldehydes. They are adapted to a great variety of uses, e. g. in forming protective coatings for pickling tanks, electroplating tanks and for leak-proofing wooden tanks, for coating floors, for coating ventilating ducts used for acids and other corrosives, for coating pipes and for waterproofing concrete and so forth. They may be applied to steel which is free from rust, oil and water, and to wood and either concrete or brick if the surface has been heated carefully to remove any trace of moisture.

The distillation of rubber and a rubber residue suitable for use in carrying out the present invention are disclosed and claimed in my copending application Serial No. 724,951, filed May 10, 1934.

What I claim is:

1. A tank lined with a plastic combination which comprises asphalt and a rubber distillation residue which on the vertical walls of the tank will not flow at a given temperature between 0 and 200° F. and will not become brittle at a temperature 100 degrees F. below said given temperature.

2. A tank lined with a plastic composition comprising a rubber distillation residue, blown asphalt and an inert filler which does not become brittle at any given temperature between zero and 200° F. and does not flow on the vertical walls of the tank when heated to a temperature 100° above said given temperature.

CLAUDE H. SMITH.